US008313253B2

(12) United States Patent
Carlesso et al.

(10) Patent No.: US 8,313,253 B2
(45) Date of Patent: Nov. 20, 2012

(54) BALL-AND-SOCKET TYPE HEAD FOR SUPPORTING OPTICAL OR VIDEO-PHOTOGRAPHIC EQUIPMENT

(75) Inventors: Abramo Carlesso, Romano d'Ezzelino (IT); Paolo Speggiorin, Mussolente (IT); Hem Sudhana, Mussolente (IT); Stelvio Zarpellon, Bassano del Grappa (IT)

(73) Assignee: GITZO S.A., Rungis (FR)

( * ) Notice: Subject to any disclaimer, the term of this patent is extended or adjusted under 35 U.S.C. 154(b) by 120 days.

(21) Appl. No.: 12/741,074

(22) PCT Filed: Oct. 21, 2008

(86) PCT No.: PCT/EP2008/064188
§ 371 (c)(1),
(2), (4) Date: May 7, 2010

(87) PCT Pub. No.: WO2009/059892
PCT Pub. Date: May 14, 2009

(65) Prior Publication Data
US 2010/0266271 A1    Oct. 21, 2010

(30) Foreign Application Priority Data

Nov. 8, 2007    (IT) .............................. PD2007A0365

(51) Int. Cl.
*G03B 15/00* (2006.01)
*G03B 17/00* (2006.01)
(52) U.S. Cl. .......................................... 396/428; 396/5
(58) Field of Classification Search .................. 396/428; 248/181.1–181.2
See application file for complete search history.

(56) References Cited

U.S. PATENT DOCUMENTS

| 2,859,059 A | 11/1958 | De Loach |
| 3,737,130 A | 6/1973 | Shiraishi |
| 2006/0269277 A1* | 11/2006 | Speggiorin .................... 396/428 |
| 2006/0285844 A1* | 12/2006 | Hershenzon .................. 396/421 |
| 2007/0086850 A1 | 4/2007 | Ronsheim |
| 2007/0090237 A1 | 4/2007 | Hsu |
| 2007/0152116 A1* | 7/2007 | Madsen .................... 248/181.1 |

FOREIGN PATENT DOCUMENTS

GB    242910 A    11/1925

OTHER PUBLICATIONS

Notification of Transmittal of the International Search Report and the Written Opinion—PCT/EP2008/064188.
Notification of Transmittal of the International Preliminary Report on Patentability—PCT/EP2008/064188.

* cited by examiner

*Primary Examiner* — Clayton E Laballe
*Assistant Examiner* — Dennis Hancock
(74) *Attorney, Agent, or Firm* — Kristina Castellano; Castellano PLLC

(57) ABSTRACT

A ball-and-socket type head (1) for optical and video-photographic equipment comprises:
  a sphere portion (6) on which is fixed an attachment plate (7) for the optical or video-photographic equipment,
  a main body (2) in which is defined a seat (5) in which the sphere portion is received in engagement for adjustably orienting the attachment plate with respect to the main body,
  a locking means (20) acting between the sphere portion and the main body in order to lock the sphere portion in a desired position relative to the main body, and arranged within the volume defined by the sphere portion (6) and by the seat (5), and
  an actuating means (30) for actuating the locking means arranged on said sphere portion.

13 Claims, 3 Drawing Sheets

BALL-AND-SOCKET TYPE HEAD FOR SUPPORTING OPTICAL OR VIDEO-PHOTOGRAPHIC EQUIPMENT

TECHNICAL FIELD

The present invention relates to a ball-and-socket type head for supporting optical or video-photographic equipment, having the characteristics mentioned in the preamble of the main claim.

TECHNOLOGICAL BACKGROUND

In the technical field of reference of the invention, supports for optical or video-photographic equipment are widely known which are generally intended to be fixed on a stand such as a tripod or monopod, and comprising a ball-and-socket joint which permits the orientation of the supported equipment, with respect to the stand, into a position desired by the operator. Such supports, commonly known as ball-and-socket type heads, have some drawbacks however, including a relatively heavy weight and a substantial overall bulk. In addition, the operation of orientation and locking of the equipment with respect to the stand normally requires the use of both hands by the operator: the first engaging with the equipment in order to orient it, and the second engaging with the locking means, integral with the fixed part of the articulated joint, normally in the form of a knob, for locking the articulated joint in the desired position.

DESCRIPTION OF THE INVENTION

The problem underlying the present invention is that of providing a ball-and-socket type head for supporting optical or video-photographic equipment and structurally and functionally designed to remedy the limitations disclosed above with reference to the prior art cited.

This problem is solved by the present invention by means of a ball-and-socket type head produced according to the following claims.

BRIEF DESCRIPTION OF THE DRAWINGS

The characteristics and advantages of the invention will become clearer from the detailed description of a preferred exemplary embodiment thereof, illustrated by way of non-limiting example with reference to the appended drawings, in which.

PREFERRED EMBODIMENT OF THE INVENTION

Figure 1:
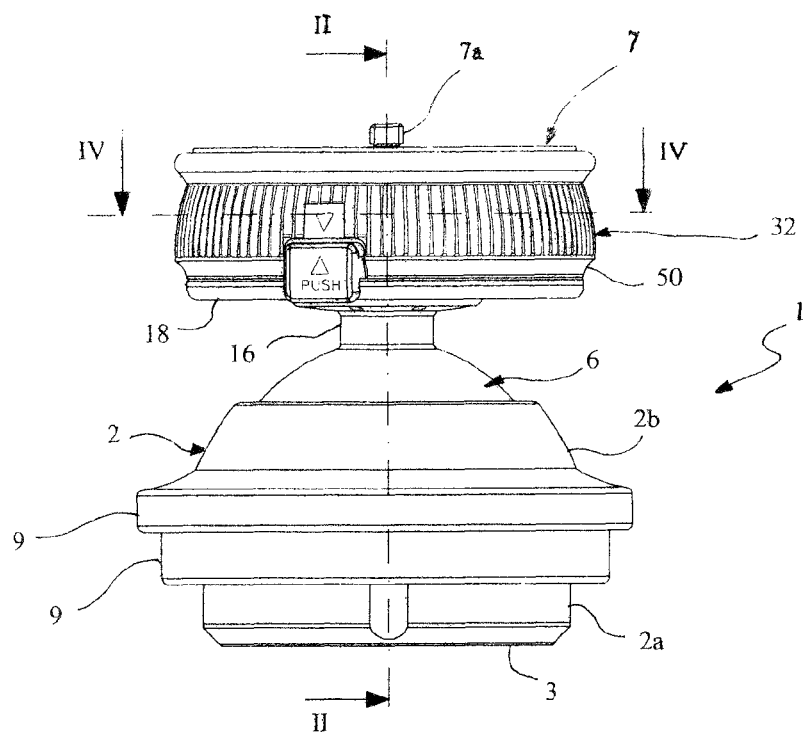
FIG. 1 is a front view of a ball-and-socket type head produced according to the present invention.

In the drawings, the reference 1 indicates as a whole a ball-and-socket type head for supporting optical or video-photographic equipment and produced according to the present invention.

The ball-and-socket type head 1 comprises a main body 2 on which is defined a base 3 for supporting the head 1 on a stand, conventional per se, such as for example a tripod. To this end, a threaded hole 4 is provided on the base 3 for coupling to a column tripod with standard screw attachment, and an adaptor 4a is also provided for screw attachments of reduced size. The head 1 may also be coupled to tripods devoid of a column, for example directly on the spider for articulation of the legs, and in this case the hole 4 may be used for the mounting of an accessory hook.

The main body 2 defines inside it a seat 5, of generally spherical profile, wherein a sphere portion 6 is received and held in engagement in such a way as to define a ball-and-socket type joint, with the centre at A. Onto the sphere portion 6, on the opposite side with respect to the main body 2, is fixed an attachment plate 7 for fixing the head 1 to an item of generic optical or video-photographic equipment, not shown in the appended drawings. On the attachment plate 7, anchorage means of the screw type 7a, or of a different type (for example a quick-coupling attachment) may be provided.

The main body 2 comprises a lower shell 2a and an upper shell 2b, joined to each other by screws 8, at respective flanges 9 extending radially along a substantially equatorial plane of the sphere defined by the seat 5.

Inside the lower shell 2a a raised portion 10 is provided, standing up from the base 3 towards the centre A of the ball-and-socket joint, and at the apex of which a seat 11 with conical profile is provided, the function of which will be explained hereinafter.

The upper shell 2b is provided with an aperture bounded by an edge 13 substantially parallel to the base 3 and from which the sphere portion 6 emerges.

This latter comprises a spherical cap 14, in contact with the main body 2, in particular at a peripheral zone 13a adjacent to the edge 13, a collar-type formation 15 standing up from the spherical cap 14 along a central axis X of same towards the centre A of the articulated joint, and a stem 16 standing up from the spherical cap 14 along the axis X on the opposite side from the collar-like formation 15.

The stem 16 is further traversed axially by a cavity 17, passing right through and open at the spherical cap 14, substantially at the centre of the collar-like formation 15.

To the apex of the stem 16 is fixed, by means of screws 18a, a support flange 18 on which is in its turn fixed, by means of screws 19, the attachment plate 7.

As will be evident from the preceding description, and in addition from the appended drawings, the possibility of orientation of the sphere portion 6 with respect to the main body 2 is delimited by the interference of the stem 16 with the edge 13.

The edge 13 is located on the same side as the stem 16, so that the sphere portion 6 is movable with respect to the main body 2 through a solid angle of less than 180°.

In order to simplify the process of production of the sphere portion 6, provision is advantageously made for the peripheral zone 13a of contact between the sphere portion 6 and the main body 2 to have a conical profile, such that the contact is substantially limited to a circumference.

The ball-and-socket type head 1 also comprises a locking means, indicated as a whole by 20, acting between the main body 2 and the sphere portion 6, and which can be selectively actuated by an operator for locking the sphere portion 6 in a desired position with respect to the main body 2.

According to a first aspect of the present invention, the locking means 20 is arranged within the volume defined by the sphere portion 6 and by the seat 5.

In more detail, the locking means 20 comprises a plunger member 21, housed in sliding engagement inside the collar-like formation 15, and a locating element 22 connected to the main body 2 against which the plunger member 21 abuts.

The locator element 22 preferably has a contact surface with the plunger member 21 of the spherical type and, even more preferably, it comprises a ball 23 housed in the seat 11 provided on the raised portion 10.

The diameter of the ball 23 is substantially reduced with respect to that of the sphere defined by the seat 5 and is selected such that its centre coincides with the centre A of the articulated joint.

As an alternative to the preferred form described, the locator element 22 may be formed by an appendage having a spherical profile at the top, provided at the top of the raised portion 10 and which, at the limit, could also be reduced to form a point of the raised portion 10.

The plunger member 21 comprises a first portion 24 in contact with the collar-like formation 15, a second portion 25 in contact with the ball 23, and also resilient means 26, for example a Belleville washer, interposed between the two portions 24, 25 of the plunger member 21 in order to urge them away from each other.

The second portion 25 is housed in a seat provided in the first portion 24 and abuts against the ball 23 at a recess 27, with substantially conical profile, provided on the second portion itself.

The first portion 24 faces the bottom of the collar-like formation 15, where a kerb 28 is provided, slightly raised with respect to the surface of the spherical cap 14, for locating the plunger member 21 when displaced towards the spherical cap 14.

The head 1 further comprises an actuating means 30, which can be directly actuated by an operator in order to activate the locking means 20.

According to a further aspect of the invention, the actuating means 30 is arranged on the sphere portion 6 in such a way as to displace the plunger member 21 inside the collar-like formation 15 in a direction away from the spherical cap 14, so as to urge the sphere portion 6, in a locking manner, against the peripheral zone 13a of the upper shell 2b of the main body 2.

The actuating means 30 comprises a pin 31, housed in the cavity 17 in sliding engagement along the axis X and which is mechanically connected to a control ring nut 32 arranged behind the attachment plate 7 in a position interposed between this latter and the support flange 18.

The control ring nut 32 is rotatable about the axis X and, by means of gearing 33, its rotational motion is transformed into a rectilinear movement of the pin 31 along the cavity 17.

In detail, the gearing 33 comprises a crown 34 with internal toothing provided integrally on the control ring nut 32, which meshes with a pair of intermediate gearwheels 35, with fixed axis parallel to the axis X, each of which in its turn meshes with a pinion 36, rotatable about the axis X. In a preferred embodiment thereof, provision is made for the pinion 36 to be provided axially with a threaded through-hole 36a in which a head 31a of the pin 31 is engaged by screwing.

This characteristic, combined with the provision of an anti-rotation means between the pin and the cavity 17, effects the axial displacement of the pin 31 along the cavity 17 as a result of the rotation of the pinion 36. The aforesaid anti-rotation means comprises on the pin an enlarged portion 31b of hexagonal cross-section engaged in a corresponding portion 17a of similar cross-section provided in the cavity 17.

Advantageously, the gearing 33 is a revolution multiplier, having a multiplication ratio of preferably between 4 and 5.

Besides the preferred embodiment described above, provision is made for the pinion 36 to be integral with the pin 31 and for the axial displacement of same to be effected by a screw coupling between the pin 31 and the inner walls of the cavity 17.

The transmission of the motion from the pin 31 to the plunger member 21 takes place preferably by means of fluid mechanics.

To this end, a gasket 37 is mounted on the pin 31 at its end facing towards the plunger member 21, and this latter is provided with sealing rings 38 arranged between the plunger member and the collar-like formation 15. In this way a chamber 39 is defined, hydraulically sealed, closed at the top by the pin 31 and at the bottom by the plunger member 21, and in which an incompressible fluid, for example oil, is arranged.

The ratio between the surfaces with which the plunger member 21 and the pin 31 press on the chamber 39 is between 10 and 20, for example 15. In this way it will be sufficient to apply a reduced force to the pin 31 in order to obtain a high thrusting stress of the plunger member 21 on the ball 23.

On the plunger member 21a threaded hole 41 is further provided, opening into the chamber 39, and into which is screwed a plug 42 (in the form of a grub screw) provided with a gasket 43. In this way, besides permitting access to the chamber 39, it is possible to regulate the internal pressure at the chamber itself, by displacing the plug 42 away from or towards the spherical cap 14 by screwing.

In order to maintain the pinion 36 in a state coplanar with the intermediate gearwheels 35, effectively opposing the pressure exerted on the pin 31 by the oil, a roller bearing 44 is interposed between the pinion 36 and the attachment plate 7.

The actuating means 30, as a whole, could be produced in a manner different from that preferred and given as an example here. For example, the pin could be displaced directly via a lever mechanism or a wheel with horizontal axis meshing in a rack provided on the pin 31.

Moreover, the pin 31 could be connected directly to the plunger member 21.

The ball-and-socket type head 1 also comprises means for limiting the stroke of the control ring nut 32, comprising an adjusting ring 50, arranged coaxially with the ring nut 32, between this latter and the support flange 18. The adjusting ring 50 is provided with one or more grooves 51, extending to a limited degree along arcs of circumference of the ring itself, and engaged by one or more teeth (not visible in the drawings) provided on the control ring nut 32.

The position of the adjusting ring 50 with respect to the sphere portion 6 is selectively adjustable by means of a pawl 53 integral with the ring 50 and engageable in one of a plurality of recesses 54 arranged at a pitch along the circumferential perimeter of the support flange 18.

The pawl 53 is disengaged from the recess 54 by the action of a push-button 55 which, against the action of a spring 56, is radially displaceable.

Figure 2:
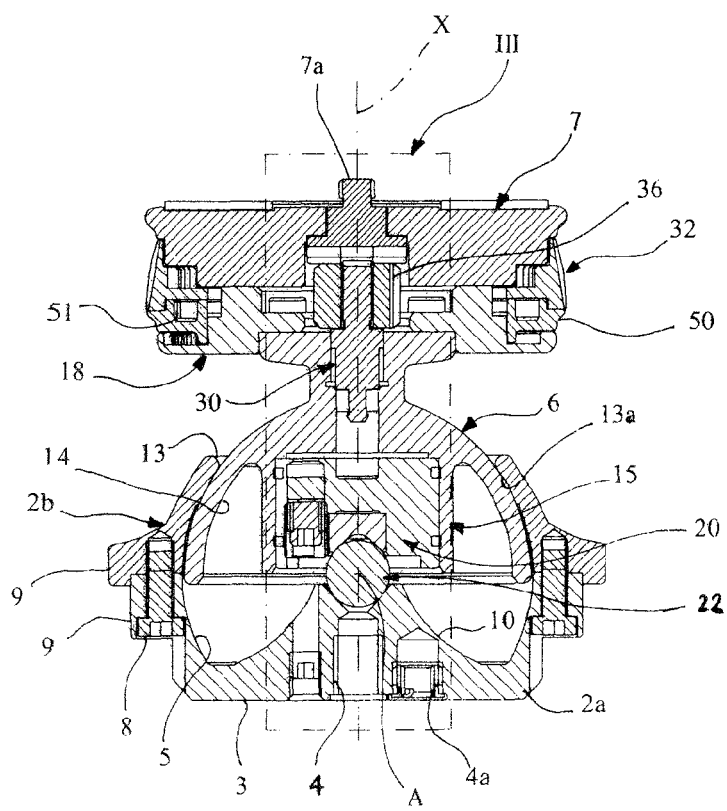
FIG. 2 is a view in longitudinal section along the line II-II of FIG. 1.
Figure 3:
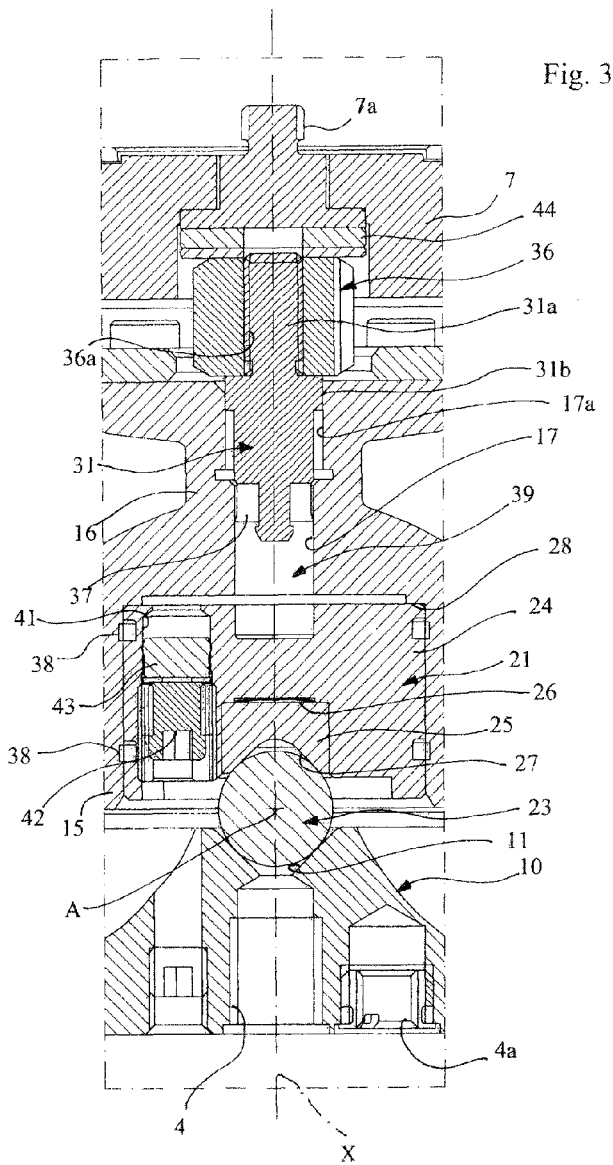
FIG. 3 is a view on an enlarged scale of a first detail of the section of FIG. 2.
Figure 5:
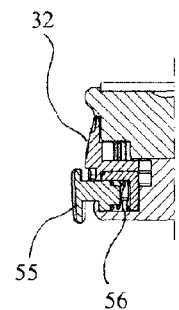
FIG. 5 is a view in longitudinal section of a second detail of the ball-and-socket type head of FIG. 1.
Figure 4:
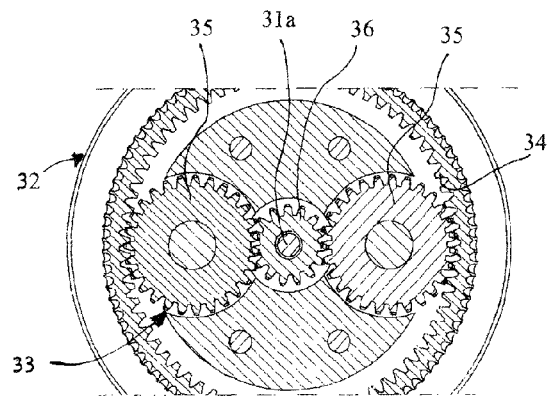
FIG. 4 is a view in partial cross-section along the line IV-IV in FIG. 1.
Figure 6:
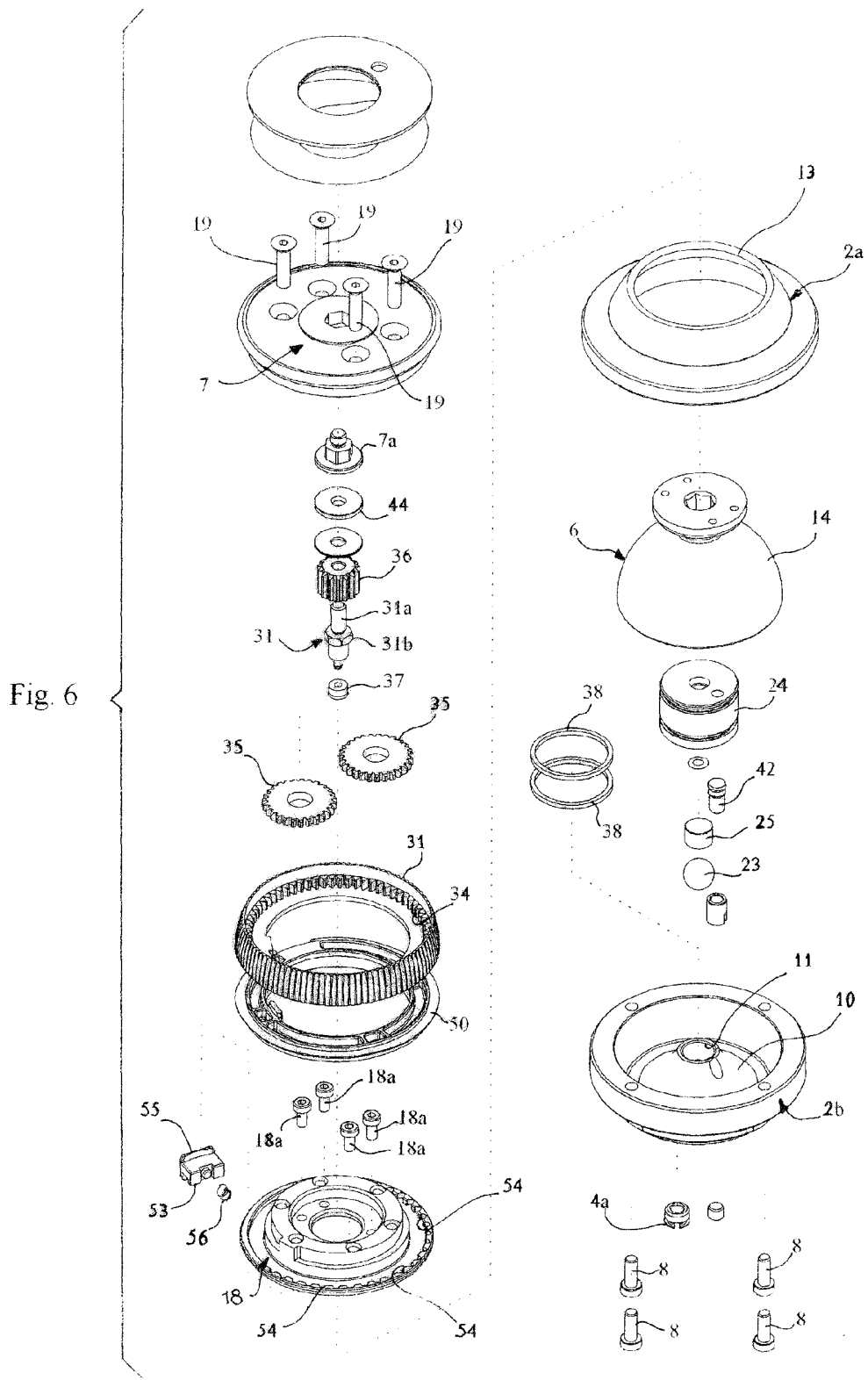
FIG. 6 is an exploded view of the ball-and-socket type head of FIG. 1.

The ball-and-socket type head 1 with the locking means completely loosened has the configuration shown in FIG. 2, with the plunger member 21 resting on the kerb 28, behind the spherical cap 14.

It should be noted that the presence of the kerb 28 prevents the plunger member from completely bearing on the bottom of the collar-like formation 15, which would cause the loss of the favourable ratio of surfaces in the hydraulic transmission system between the pin 31 and the plunger member 21.

In this initial configuration, the minimum friction level of the ball-and-socket joint is ensured by the action of the resilient means 26 which, by moving the two portions 24 and 25 of the plunger member 21 away from each other, pushes the spherical cap 14 against the upper shell 2b of the main body 2.

The degree of minimum friction level is moreover adjustable, typically in the stage of assembly and testing of the head, by means of displacement of the plug 42 which, by increasing or decreasing the useful volume of the chamber 39, allows corresponding variation of the minimum value of the pressure within the chamber itself.

The operator is allowed a further possibility of regulation of the degree of minimum friction of the ball-and-socket joint by acting on the adjusting ring 50, which by limiting the rotational stroke of the control ring nut 32 can cause the plunger member 21 not to come into abutment on the kerb 28, thus leaving a residual pressure inside the chamber 39.

The value of the minimum friction level may therefore be imposed from time to time by the operator on the basis of the weight and the characteristics of the equipment to be mounted on the ball-and-socket type head 1.

Once the equipment has been oriented as desired, it is possible to lock the ball-and-socket joint in position by rotating the control ring nut 32. This rotation involves the corresponding rotation (suitably multiplied) of the pinion 36, the consequent axial translation of the pin 31 along the cavity 17 and therefore, by means of the hydraulic transmission system, the displacement of the plunger member 21 along the collar-like formation 15 which pushes the spherical cap in a locking action by friction against the peripheral zone 13a of the main body 2.

It should be noted that, advantageously, the locking/unlocking operation can be carried out with only one hand, in particular with the same hand which is holding up the equipment, the ring nut 32 being positioned immediately behind same, thereby permitting effective and rapid positioning and a greater guarantee against accidental dropping of the equipment. Not only this, the control of the ring nut 32 is particularly facilitated by the fact that the ring nut is integral with the sphere portion 6, the movable part of the articulated joint, such that the ring nut is always in the same relative position with respect to the hand which is holding up the equipment, rendering it accessible from any side, independently of the positioning of the optical axis of the equipment with respect to the attachment plate, with consequent and immediate advantages for both right-handed and left-handed persons.

It will further be appreciated that the provision of revolution multiplying gearing and the provision of a hydraulic transmission system make it possible to develop very high stresses, obtaining particularly effective locking of the articulated joint, by means of a relatively small rotation of the control ring nut 32.

Moreover, the particular configuration of the locking means makes it possible to utilise to the maximum the internal spaces for the components of the articulated joint, optimising volumes and overall weights of the ball-and-socket type head 1 with respect to the known ball-and-socket type heads, in which the locking means is typically external to the sphere portion.

The present invention therefore solves the problem mentioned above with reference to the prior art cited, at the same time providing numerous other advantages.

The invention claimed is:

1. A ball-and-socket type head for optical or video-photographic equipment, comprising:
   a sphere portion on which is fixed an attachment plate for said optical or video-photographic equipment,
   a main body in which is defined a seat in which said sphere portion is received in engagement for adjustably orienting said attachment plate with respect to said main body,
   a locking means acting between said sphere portion and said main body in order to lock said sphere portion in a desired position relative to said main body, said locking means being arranged within the volume defined by said sphere portion and by said seat; and
   an actuating means arranged on said sphere portion for activating said locking means and comprising a pin slidable within a cavity provided in said sphere portion,
   wherein said actuating means comprises a control ring nut arranged behind said attachment plate and coaxial therewith, mechanically connected to said pin for displacing said pin within said cavity.

2. The head according to claim 1, wherein said locking means comprises a plunger member, slidably housed in a seat provided in said sphere portion and abutting against a locator element connected to said main body, and said actuating means is connected to said plunger member in order to displace it within said seat in a direction away from said sphere portion, so as to urge said sphere portion in a locking action against said main body.

3. The head according to claim 2, wherein said locator element comprises a ball having a lesser diameter than said sphere portion and concentric therewith, and which is housed in a seat provided in said main body.

4. The head according to claim 2, wherein said plunger member comprises:
   a first portion in contact with said sphere portion on the opposite side from said locator element,
   a second portion in contact with said locator element, and
   resilient means interposed between said first and second portion, for urging said first and second portion away from each other.

5. The head according to claim 2, wherein said sphere portion comprises a spherical cap in contact with said main body, from which stands up towards said locator element a collar-like formation constituting said seat for housing said plunger member.

6. The head according to claim 2, wherein said cavity in which said pin is slidable is in fluid communication with said plunger member on the opposite side from said locator element such as to define a closed chamber bounded by said sphere portion, by said pin and by said plunger member, and in which an incompressible fluid is arranged.

7. The head according to claim 6, wherein on said plunger member a hole is provided, opening into said chamber and closed by a plug slidable in said hole to adjust the pressure of said incompressible fluid in said chamber, or to gain access thereto.

8. The head according to claim 6, wherein the ratio between the surfaces with which said plunger member and said pin press on said chamber is between 10 and 20.

9. The head according to claim 2, wherein a stroke limiting means is provided for said control ring nut in order to define a position of maximum distance of said pin from said plunger member.

10. The head according to claim 9, wherein said stroke limiting means comprises an adjusting ring, the position of which with respect to said sphere portion is selectively modifiable, said adjusting ring being coupled to said control ring nut by means of the sliding of a tooth, provided on one of said adjusting ring and said control ring nut, within a groove of limited length provided on the other of said adjusting ring and said control ring nut, such that the stroke of said control ring nut is limited by said tooth meeting an end of said groove.

11. The head according to claim 1, wherein said pin and said control ring nut are connected to each other by means of revolution multiplying gearing.

12. The head according to claim 11, wherein said revolution multiplying gearing has a multiplication ratio of between 4 and 5.

13. The head according to claim 11, wherein said revolution multiplying gearing comprises a crown with internal toothing integral with said control ring nut, meshing with at least one intermediate gearwheel which meshes with a pinion, said pin being engaged by screwing in a threaded hole provided on said pinion.

* * * * *